US010195760B2

(12) United States Patent
Firth et al.

(10) Patent No.: US 10,195,760 B2
(45) Date of Patent: Feb. 5, 2019

(54) IMPROVEMENTS TO ROUTER APPARATUS

(71) Applicant: Power Box AG, Zug (CH)

(72) Inventors: Robert Firth, North Yorkshire (GB); Andrew Linton, North Yorkshire (GB)

(73) Assignee: Power Box AG, Zug (CH)

( * ) Notice: Subject to any disclaimer, the term of this patent is extended or adjusted under 35 U.S.C. 154(b) by 0 days.

(21) Appl. No.: 15/549,969

(22) PCT Filed: Jan. 18, 2017

(86) PCT No.: PCT/IB2017/000022
§ 371 (c)(1),
(2) Date: Aug. 9, 2017

(87) PCT Pub. No.: WO2017/125812
PCT Pub. Date: Jul. 27, 2017

(65) Prior Publication Data
US 2018/0029248 A1 Feb. 1, 2018

(30) Foreign Application Priority Data
Jan. 18, 2016 (GB) .................................. 1600883.1

(51) Int. Cl.
*B23C 1/20* (2006.01)
*B27C 7/06* (2006.01)
(Continued)

(52) U.S. Cl.
CPC .................. *B27C 7/06* (2013.01); *B27C 5/02* (2013.01); *B27C 5/10* (2013.01)

(58) Field of Classification Search
CPC .... B27C 5/02; B27C 5/10; B27C 7/06; B23C 1/20; Y10T 409/306608
See application file for complete search history.

(56) References Cited

U.S. PATENT DOCUMENTS 5,207,253 A * 5/1993 Hoshino ................... B27C 5/10 144/136.95
5,273,089 A * 12/1993 Fuchs ....................... B27C 5/10 144/136.95
(Continued)

FOREIGN PATENT DOCUMENTS

EP 1522389 4/2005
EP 1522393 4/2005

OTHER PUBLICATIONS

WeAreTwoDoorsDown: "Features of the Triton TRA-001/TRC-001 Router", Youtube, Jan. 29, 2014 (Jan. 29, 2014), XP054977228, Retrieved from the Internet: URL:https://www.youtube.com/watch?v=rRykNbGE5zs.
(Continued)

*Primary Examiner* — Nicole N Ramos
(74) *Attorney, Agent, or Firm* — Head, Johnson, Kachigian & Wilkinson, PC

(57) ABSTRACT

A router power tool having a housing and a base, the housing mounted to be moveable with respect to the base. The base and housing are connected by first and second extendable assemblies, at least one of the assemblies including biasing means to bias the housing away from the base. This extendable assembly has a control portion which can be moved, while located with the extendable assembly, from a first position in which the biasing means provides the biasing force and a second position in which the biasing means is released. In one embodiment, the router power tool includes safety stop portions to prevent movement of the tool holder while cutting tool changing is being performed. In another embodiment, a safety stop portion limits movement of at least one of the extendable assemblies when the cover is held by the power switch when in the on position.

19 Claims, 10 Drawing Sheets

Figure 1A:
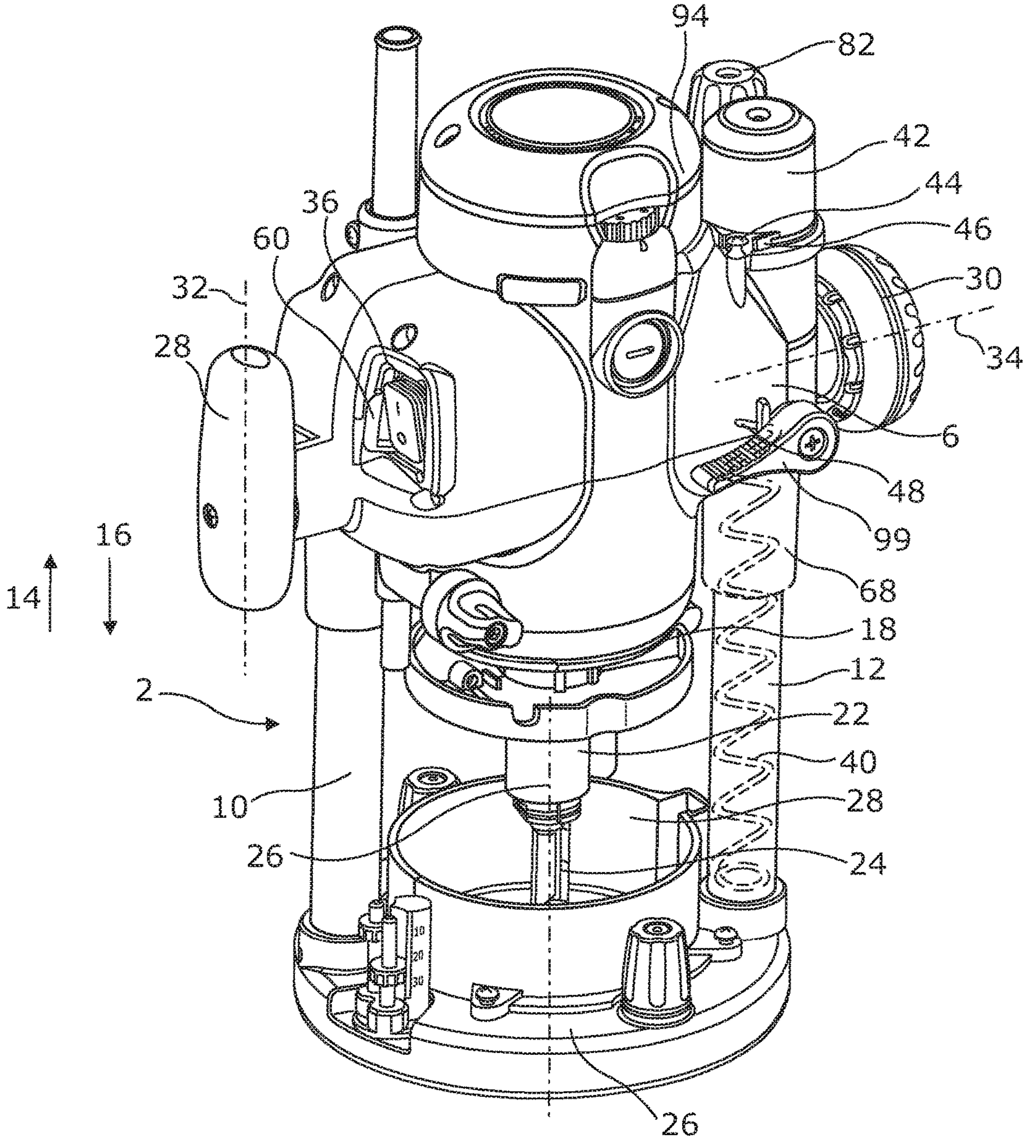

(51) Int. Cl.

| | |
|---|---|
| ***B27C 5/10*** | (2006.01) |
| ***B27C 5/02*** | (2006.01) |

(56) References Cited

U.S. PATENT DOCUMENTS

| | | | | |
|---|---|---|---|---|
| 6,863,480 | B1 * | 3/2005 | Taylor | B27C 5/02 144/136.95 |
| 6,986,369 | B1 * | 1/2006 | Cooper | B27C 5/10 144/136.95 |
| 7,578,325 | B2 * | 8/2009 | Freese | B27C 5/10 144/136.95 |
| 2004/0253068 | A1 * | 12/2004 | Gerhardt | B27C 5/10 409/182 |
| 2005/0006000 | A1 | 1/2005 | Freese et al. | |
| 2005/0163580 | A1 | 7/2005 | Mussel | |
| 2006/0067801 | A1 | 3/2006 | Van Bergen | |
| 2008/0152450 | A1 * | 6/2008 | Zaiser | B27C 5/10 409/182 |
| 2009/0050236 | A1 | 2/2009 | Thorson et al. | |
| 2009/0116923 | A1 * | 5/2009 | Kimura | B27C 5/10 409/182 |
| 2011/0073335 | A1 * | 3/2011 | Kato | B25F 3/00 173/29 |

OTHER PUBLICATIONS

Darrell Morris: "Triton Dual Mode Precision Plunge Router TRA001", Mar. 21, 2012 (Mar. 21, 2012), pp. 1-62, XP055356831, Retrieved from the Internet: URL:http://go.rockler.com/tech/48271TritonRouterInstructions.pdf.

* cited by examiner

IMPROVEMENTS TO ROUTER APPARATUS

This invention relates to improvements relating to an electric power tool, and particularly, although not necessarily exclusively, power tools of a form commonly known as a router with the tool being capable of performing work on a workpiece via a rotating cutting tool. The router can typically be mounted for use above or below a work surface on which the workpiece is located. When in the configuration of use above the work surface, the movement of the tool is typically guided by hand, or alternatively the workpiece on which the work is being performed can be moved with respect to the tool which is held in a fixed position and when the tool is in the second configuration of use the tool is typically attached to the workbench and the movement of the housing of the tool with respect to the work surface and work piece is performed by a winding mechanism.

The router is provided with a housing in which there is located a motor provided in connection with a shaft on which a tool holder and cutting tool are mounted. The shaft, tool holder and cutting tool are aligned along the longitudinal axis of the shaft so that the shaft, tool holder and cutting tool are rotated about said axis. A base plate is connected to the housing by extendable assemblies and the cutting tool extends through an aperture in the base to perform the cutting operation on the workpiece which lies to the opposite side of the base from the housing.

The motive power for the tool holder and cutting tool are aligned along the longitudinal axis of the cutting tool. The cutting tool is held by a tool holder which conventionally is difficult to access in order to allow the cutting tool to be changed, especially when the router is used in the under work surface configuration. Furthermore, the tool holder is typically limited in its movement and is normally not designed to extend beyond the aperture in the base through which the cutting tool passes. This limitation introduces a number of problems and in particular reduces the ability to easily change the cutting tool and, as previously indicated, this is further exacerbated if the router is to be used in the under work surface operation and, if used above the work surface, when used in conjunction with a guide structure.

Furthermore, as the tool holder is located between the housing and the base by extendable support assemblies, access to the tool holder is restricted by the extendable assemblies and the base plate. This means that when the cutting tool is to be changed, the tool holder needs to be immobilised by depressing and holding an in built lock to prevent rotation of the shaft or by using a key with one hand to immobilise the shaft while the tool holder engagement of the cutting tool is loosened using a key with the other hand. In either case, the cutting tool changing operation is a two-handed operation which is made more difficult by the limited accessibility of the tool holder.

A further known problem is with the use of a biasing means spring which is conventionally provided in one of the two extendable assemblies. The use of the single spring is provided such that that when the housing is moved down towards the base it is moved against the biasing force of the spring which can cause the movement of the housing to be unbalanced as only one of the telescopic assemblies is acting against the spring and, as the assemblies are located on opposing sides of the shaft, so the force applied to one side of the housing is greater than at the other. A further problem with the conventional spring arrangement is that while the spring is required in order to provide a bias for the housing to move to the raised position when the router is in the configuration for use above the work surface, the spring is required to be released from providing a biasing force when the router is attached to the underside of the work surface for use, so as to remove the biasing force of the spring and hence reduce the movement force which is required to be used by a winding mechanism, which may be manually or powered driven, provided to move the housing to and away from the underside of the work surface. Conventionally, the release of the spring and hence removal of the biasing force is achieved by removing the spring from the extendable assembly when the tool is attached to the underside of the work surface but this is time consuming and is prone to the spring being lost when it has been removed from the extendable assembly.

A further problem which is experienced with the body or housing of the router tool is with regard to the handles which are provided. The handles are typically provided on the housing and are in line with the respective extendable assemblies such that there is provided a first handle located at the first extendable assembly and a second handle at the second extendable assembly. These handles are provided to be gripped by the user in order to move the housing with respect to the base and, when moving the housing towards the base, allow the user to exert a force acting against the force of the aforementioned biasing means spring. Conventionally the two handles are provided of the same shape but it is found that the perceived need for the handles to be of the same shape requires other concessions to be made in the function of the tool, such as, for example, a restriction on the ease of use of a power on/off switch which is provided on the housing in order to allow the user to switch the power to the motor on or off.

It is an aim of the present invention to provide an improved router and, in particular, a router which overcomes at least one or a combination of the abovementioned disadvantages of conventional router power tools in particular.

In a first aspect of the invention there is provided a power tool which includes a housing and a base, said housing mounted to be moveable with respect to, and spaced from, the base, said housing including a motor to rotate a shaft which includes, at its free end, a tool holder for a cutting tool, said shaft extending from the housing such that the tool holder is located at or adjacent to the base and said housing is connected to the base by at least first and second extendable assemblies, at least one of the assemblies including biasing means located so as to bias the housing away from the base and wherein the said at least one extendable assembly is provided with a control portion which is movable, while located with the said extendable assembly, from a first position in which the biasing means is engaged to provide the biasing force and a second position in which the biasing means is released from providing the biasing force.

In one embodiment said control portion is provided so as to be rotated between the said first and second positions and during which the control portion moves in a linear direction.

In one embodiment the control portion is locked in said first position by securing means.

In one embodiment when the securing means is released, the control portion can be moved between the first and second positions using a screw or a bayonet fitting between a male part formed in one of the control portion or an elongate member of the said assembly and a female part formed in the other of the control portion or elongate member.

In one embodiment, the biasing means is a coil spring and when the control portion is in the second position the spring is able to extend along the assembly to a substantially relaxed position, so that no, or a reduced, biasing force is exerted.

In one embodiment the control portion is retained in contact with the assembly in both the first and second positions to a sufficient extent so as to prevent the biasing means from being removed from the assembly. This therefore ensures that the release or reduction of the biasing force can be achieved without the need to remove the spring, thereby avoiding the time consuming task of removing and replacing the spring when the tool is provided in different work configurations, and avoiding the risk of the spring being lost when it has been removed.

In one embodiment, the control portion can be moved to a third position to allow removal of the spring should, for example, the spring break or to allow the tool to be serviced.

In one embodiment the control portion is provided in the first position when the tool is to be located for use on the top side of a workbench and is moved to the second position when the tool is to be located for use on the underside of the workbench.

This aspect of the invention also prevents the safety hazard caused by the uncontrolled release and expansion of the biasing means from the open end of the extendable assembly which is a problem with conventional tools of this type.

In one embodiment the extendable assemblies are formed as telescopic assemblies. In one embodiment, for each assembly, a first elongate member is located on the base and a sleeve is located on the housing and the elongate members slidingly engage.

In one embodiment a biasing means is provided in both of the two extendable assemblies. In one embodiment a control portion is provided for each of the assemblies. In an alternative embodiment a control portion is provided for one of the assemblies and the biasing means on the other of the assemblies remains in a biasing position at all times. Typically, when two biasing means are provided, the biasing force of at least one of the biasing means is reduced and so the resistance of the biasing means in the assembly without the control portion is not as significant when the tool is on the underside of the workbench and the control portion of the other assembly has been moved to the second position.

In one embodiment the force of the two biasing means differ such that the biasing means located with the extendable assembly which includes the control portion has a greater biasing force than the biasing force of the other of the biasing means.

In one embodiment the apparatus includes a switch which allows the switching on and off of the motor and therefore allows the control of whether the cutting tool is capable of being rotated or not. In one embodiment, a cover is provided for the switch such that that the motor cannot be accidentally activated once switched off and typically the cover is spring loaded to engage with the switch to retain the switch in the off position. When a positive decision is made to move the switch to the on position the cover is held back by the switch, against the spring, when the switch is in the on position. So that the motive power cannot be accidentally activated once switched off, the slide cover is spring loaded to engage with the switch to retain the switch in the off position. It is held back by the switch, against the spring, when the switch is in the on position.

In one embodiment the cover further includes a safety stop portion which limits the progress of at least one of the extendable assemblies when the cover is held back in its retracted position by the switch in the on position.

The safety stop portion therefore limits the movement of one of the elongate members within a respective sleeve of one of the extendable assemblies and therefore limits the movement of the housing of the housing when the slide cover is held back in its retracted position by the switch in the on position. The extendable assemblies are constructed so that the tool holder is not in contact with the base plate when at least one guide arm contacts the safety stop portion.

In one embodiment the safety stop portion is formed such that the same contacts with part of the top face of the said guide arm of the extendable assembly to a sufficient extent to prevent further movement of the extendable assembly when the switch is in the on position but, at the same time, access to the interior of the extendable assembly is possible to allow a biasing means to be included in the extendable assembly whereas, previously, only one biasing means could be provided in the other of the extendable assemblies.

In one embodiment the tool holder, when mounted to the housing is able to extend through the opening in the base so that at least a portion of the tool holder lies to the side of the base plate opposing that at which the housing is provided.

In one embodiment the router is provided for use in a first configuration in which the same is attached to the underside of a work surface and the cutting tool extends through an aperture in the worksurface to contact with the workpiece mounted on the top side of the worksurface and in a second configuration for use on the top side of the worksurface in which the router can be selectively mounted on a guide plate. By enabling the tool holder to extend beyond the opening in the base access to the tool holder for tool changing is greatly improved and is of particular benefit when the router is in the first configuration of use.

In one embodiment the tool holder is engagable with the base and means are provided to disengage the power to the motor to thereby prevent rotation of the tool holder prior to contact of the tool holder with the base. The disengagement means is preferably a safety stop portion which is activated whenever the motive power is activated. When the power switch is in an off position the stop may be deactivated to enable the housing and base to be brought sufficiently close together to allow engagement of the tool holder with the base. This therefore means that the base has means of engaging said tool holder only when the power supply to the power tool is disengaged or off.

In one embodiment, when engagement is possible a locating pin in one of the base or tool holder engages with a recess formed in the other of the base or tool holder and the locating pin immobilises the tool holder and retains the tool holder in position until released.

The extendable assemblies adjustably control the relative position of the base to the housing. The assemblies typically include sleeves in which elongate members can slide and the housing is provided in one embodiment with adjustment means which when operated by the user cause fine adjustment of the relative movement of the housing with respect to the base in a positive driven manner.

In one embodiment the position of the base relative to the housing is defined by the extendable assemblies which include a guide arm or post which is received within a sleeve formed as part of the housing and the adjustment of the housing is performed by a height adjustment mechanism which, preferably, provides both coarse and fine adjustment options.

In one embodiment the height adjustment mechanism includes a sprocket which engages teeth formed a rack along the guide arm. In one embodiment the sprocket can be selectively engaged by a coarse adjustment means or a fine adjustment means.

In one embodiment the movement of the housing with respect to the base can be user selected from a plunge movement in which the user exerts the movement force to move the housing towards the base or via a rack and pinion mechanism which allows coarse or fine adjustment.

In one embodiment the fine or coarse adjustment can be achieved by manual movement of the fine or coarse adjustment means or alternatively by providing a powered movement means in attachment with the movement mechanism which causes the powered movement of the same, preferably in both user selected coarse or fine adjustment means.

In one embodiment, the tool includes first and second handles, said handles located at, or adjacent to, the extendable members on opposing sides of the said shaft and wherein the handles are provided of differing shapes.

In one embodiment the first handle has a substantially circular outline which is to be gripped and the second handle has a substantially elongate outline which is to be gripped.

In one embodiment the handles are attached to the housing, and are movable therewith, as a force is applied to the handles to move the housing towards the base.

In one embodiment the handles are attached to the housing at a location between the centre line of the housing and the lower edge of the housing so as to lower the centre of gravity of the tool.

In another aspect of the invention there is provided a power tool which includes a housing mounted to be moveable with respect to and spaced from a base, said housing including a motor to rotate a shaft which includes, at its free end, a tool holder for a cutting tool, said shaft extending from the housing such that the tool holder is located at or adjacent to the base and said housing is connected to the base by at least first and second extendable assemblies, and wherein each of the assemblies includes a biasing means located so as to bias the housing away from the base.

In one embodiment the biasing means are coil springs which are located along the longitudinal axis of the extendable assembly.

In one embodiment both the biasing means are capable of exerting substantially equal biasing forces. In an alternative embodiment the biasing forces of the respective biasing means are inequal.

In a yet further aspect of the invention there is provided a power tool which includes a housing mounted to be moveable with respect to and spaced from a base, said housing including a motor to rotate a shaft which includes, at its free end, a tool holder for a cutting tool, said shaft extending from the housing such that the tool holder is located at or adjacent to the base and said housing is connected to the base by at least first and second extendable assemblies, and wherein first and second handles are attached to the housing to allow a movement force to be exerted to move the housing towards the base and to grip the tool in use and wherein the first and second handles are asymmetrical.

In one embodiment the first handle has a substantially circular outline which is to be gripped and the second handle has a substantially elongate outline which is to be gripped.

In one embodiment the handles are attached to the housing at a location between the centre line of the housing and the lower edge of the housing so as to lower the centre of gravity of the tool.

In a yet further aspect of the invention there is provided a power tool which includes a housing mounted to be moveable with respect to and spaced from a base, said housing including a motor to rotate a shaft which includes, at its free end, a tool holder for a cutting tool, said shaft extending from the housing such that the tool holder is located at or adjacent to the base and said housing is connected to the base by at least first and second extendable assemblies, and wherein the apparatus includes a switch which allows the switching on and off of the motor and control of whether the cutting tool is capable of being rotated or not, a cover is provided for the switch such that that the motor cannot be accidentally activated once switched off and when the switch is moved to the on position the cover is held back by the switch, against a biasing force, said cover further includes a safety stop portion which limits the progress of at least one of the extendable assemblies when the cover is held by the switch in the on position and wherein the safety stop portion is formed to contact with the said guide arm of the said at least one extendable assembly to a sufficient extent to prevent further movement of the extendable assembly when the switch is in the on position and to allow a biasing means to be included in the said extendable assembly.

In a yet further aspect of the invention there is provided a power tool which includes a housing mounted to be moveable with respect to and spaced from a base, said housing including a motor to rotate a shaft which includes, at its free end, a tool holder for a cutting tool, said shaft extending from the housing such that the tool holder is located at or adjacent to the base and said housing is connected to the base by at least first and second extendable assemblies and a height adjustment mechanism is provided which includes a sprocket which engages teeth formed as a rack along a guide arm of at least one of the extendable assemblies and wherein the movement of the housing with respect to the base can be user selected between a plunge movement in which the user exerts the movement force to move the housing towards the base, or via the height adjustment mechanism operated by hand or via powered drive connected thereto.

Figure 1B:
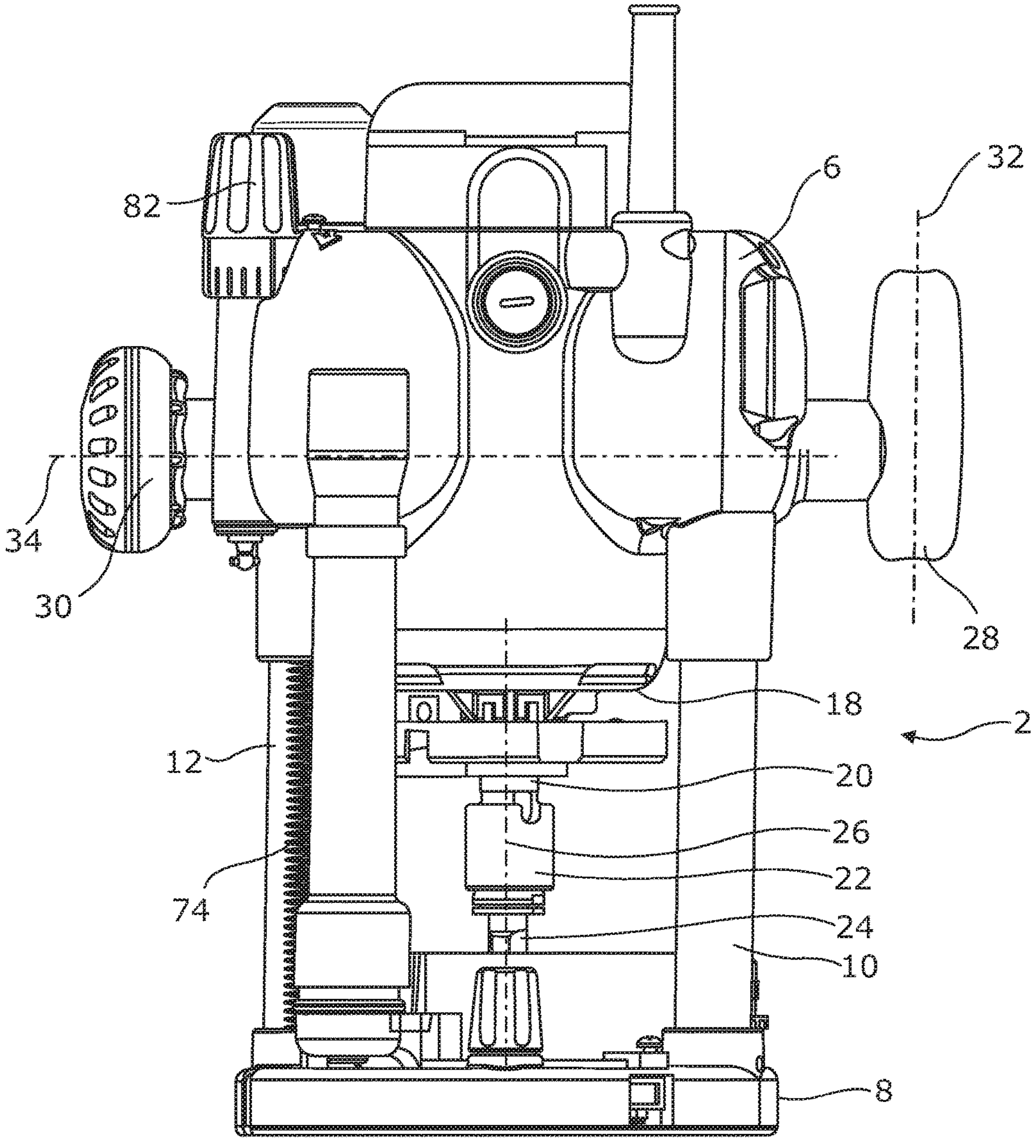
Figure 1C:
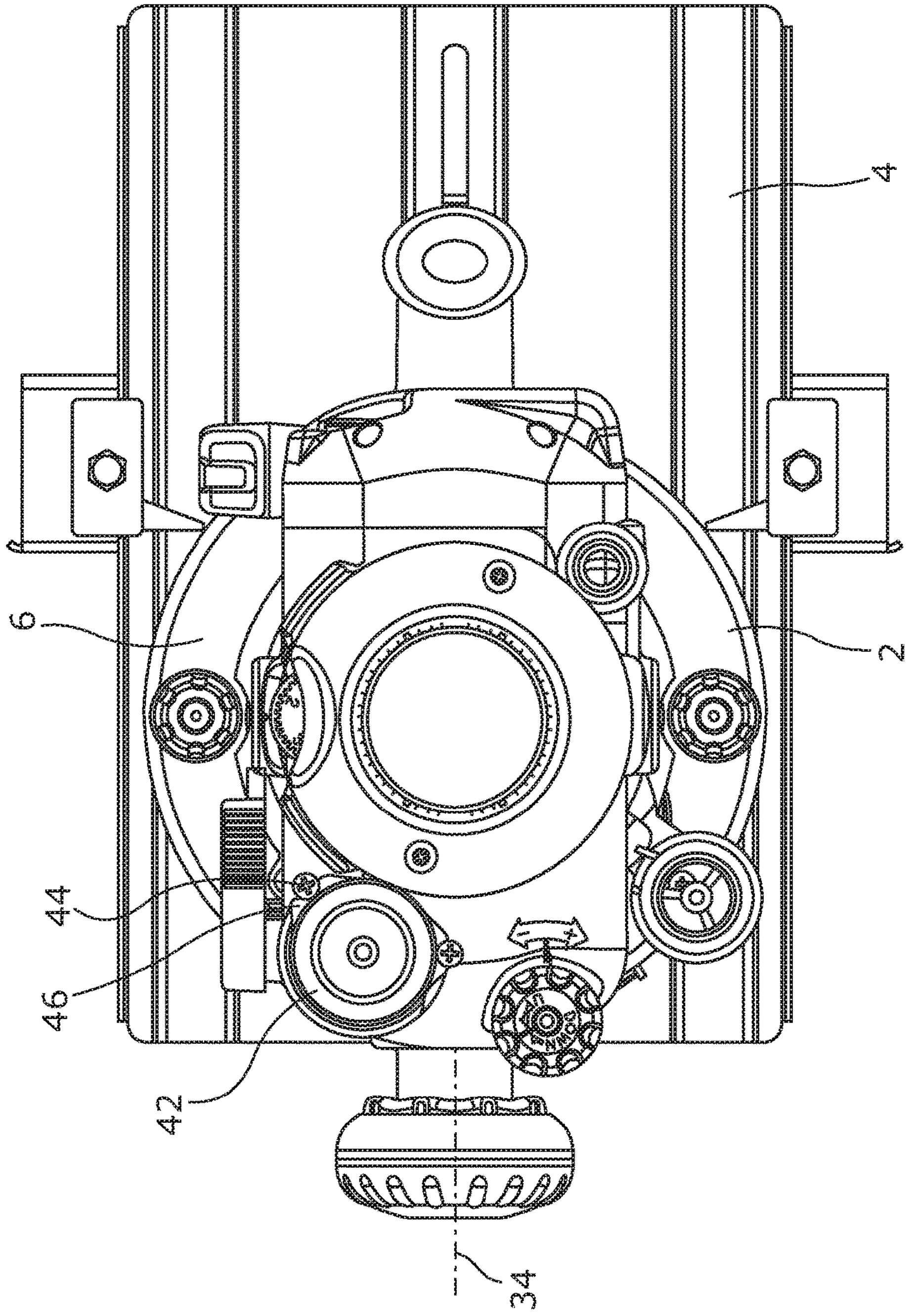
Figure 2B:
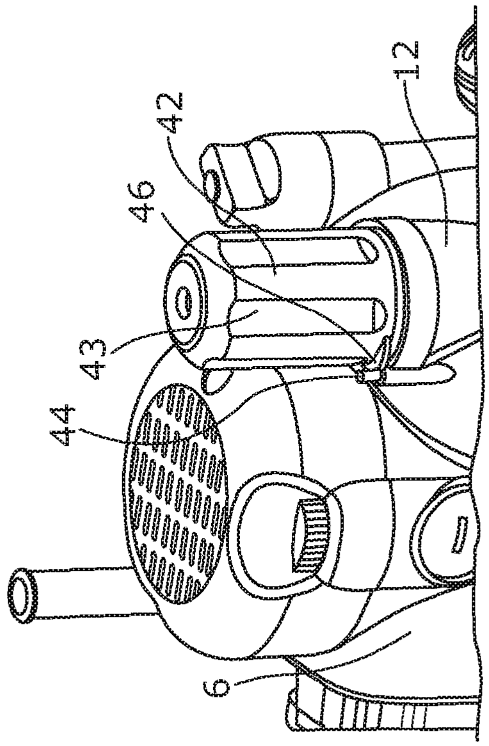
Figure 2A:
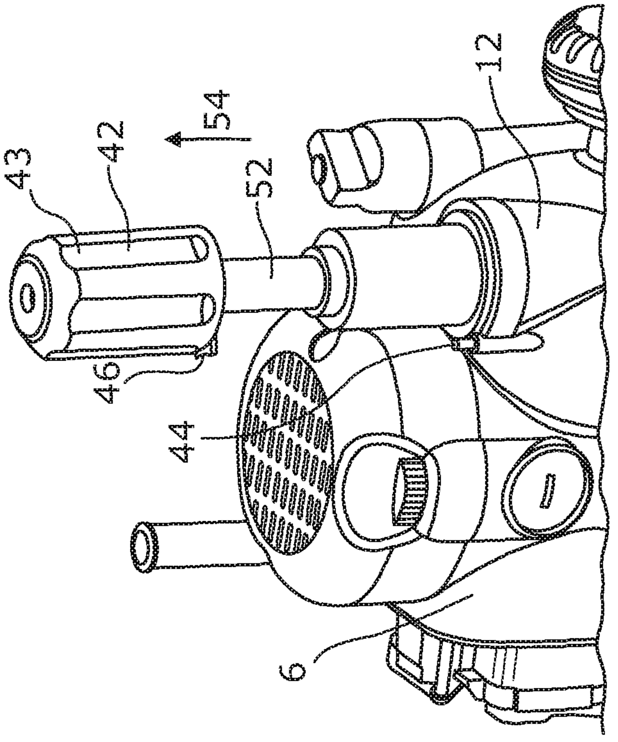
Figure 3B:
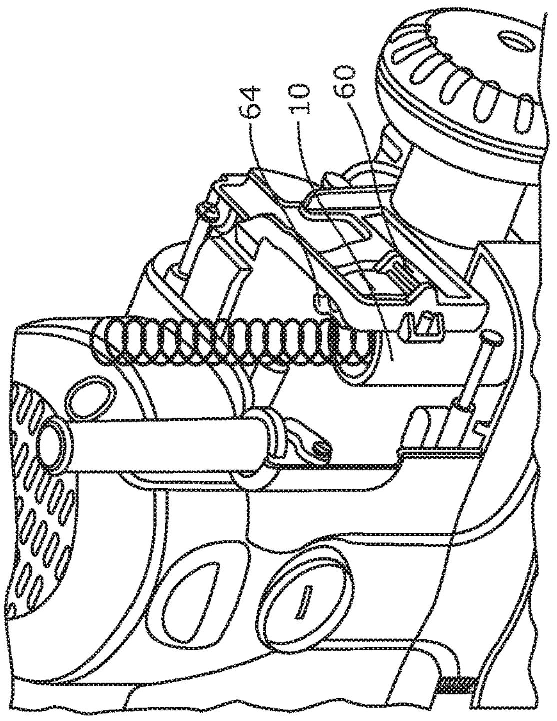
Figure 3A:
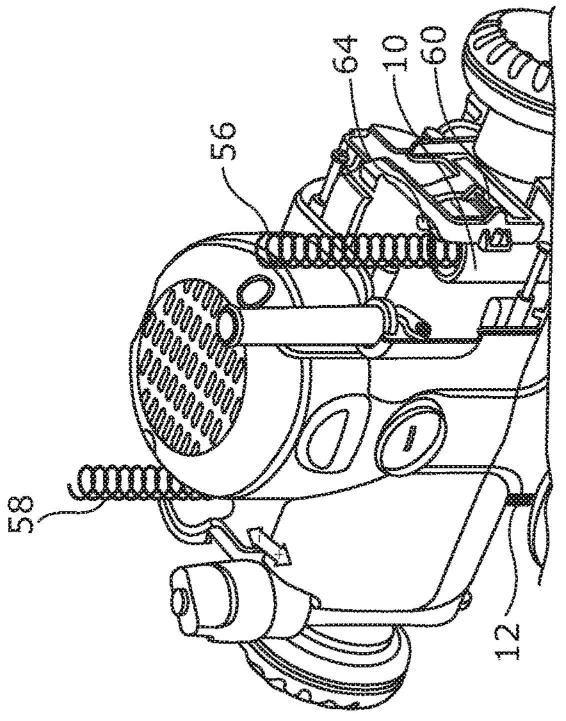
Figure 4A:
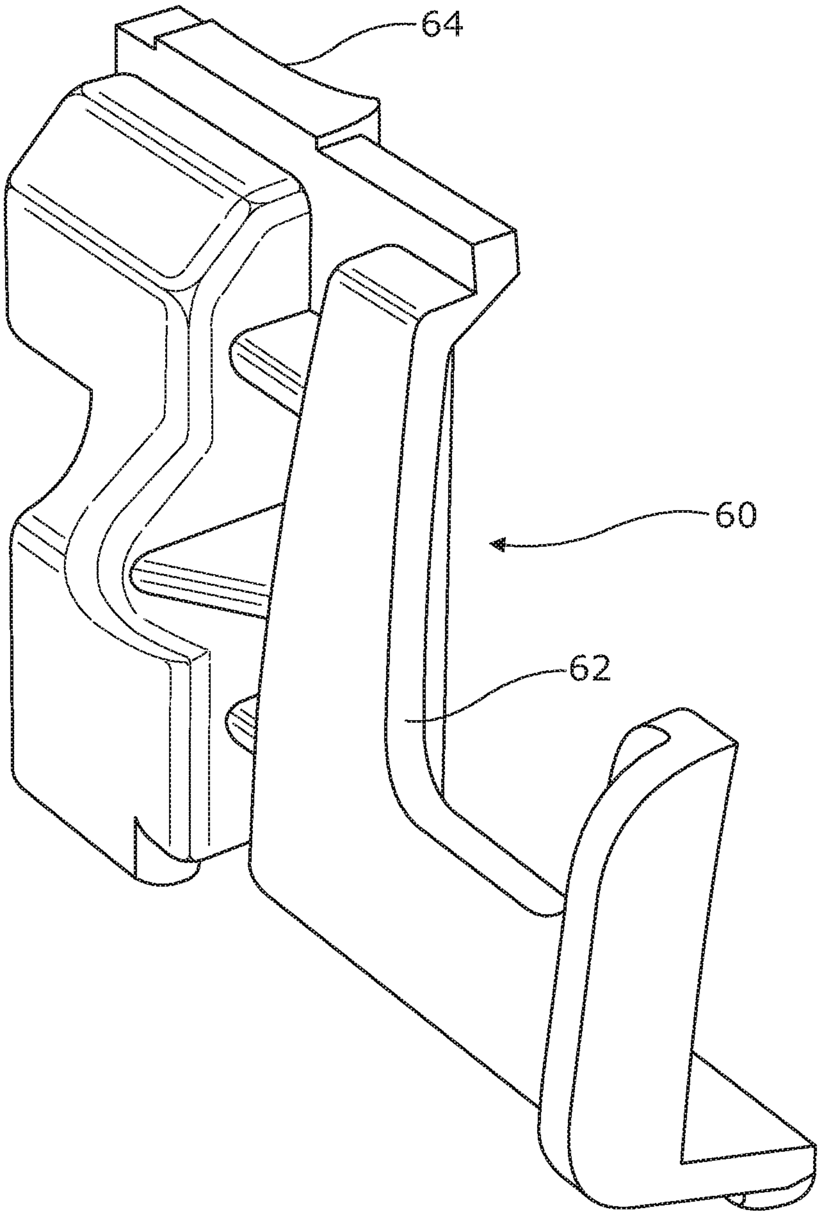
Figure 4B:
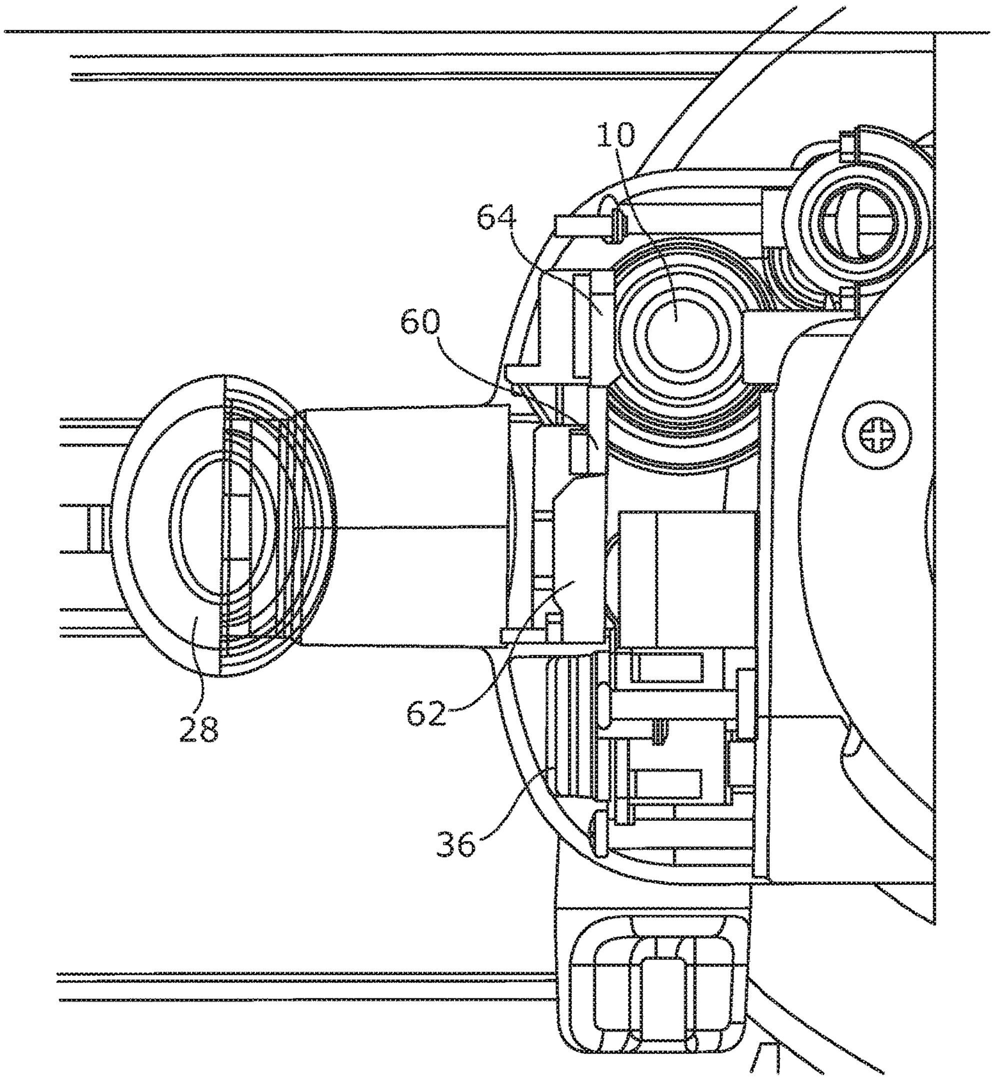
Figure 5A:
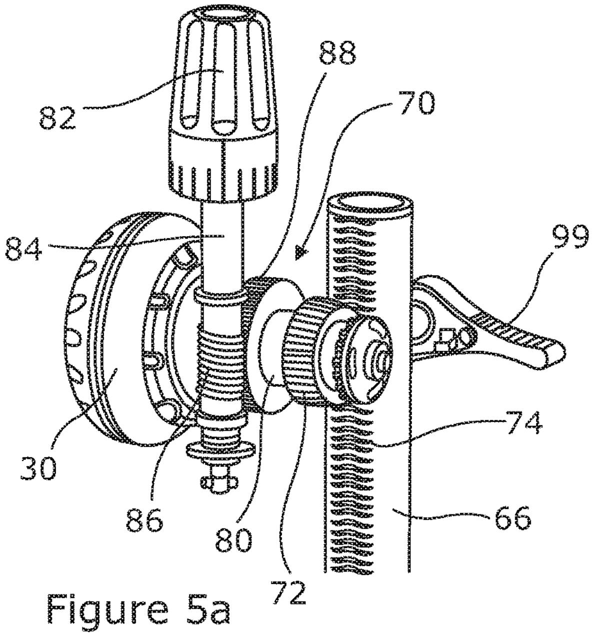
Figure 5B:
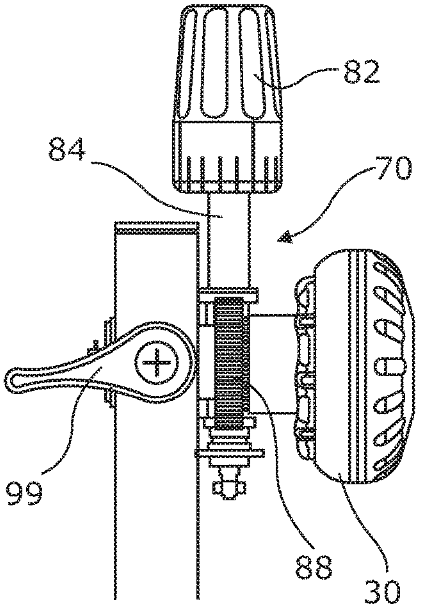
Figure 5D:
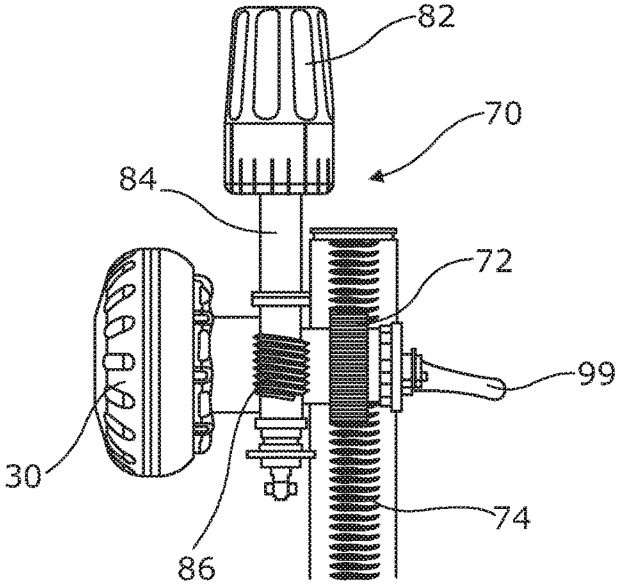
Figure 5C:
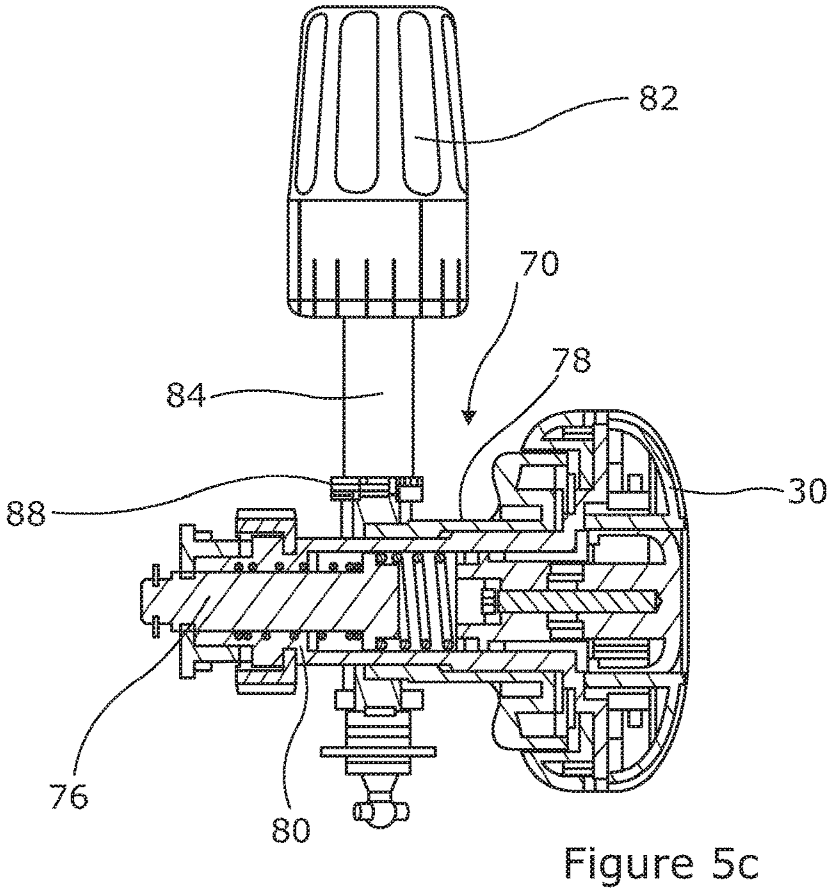
Figure 5E:
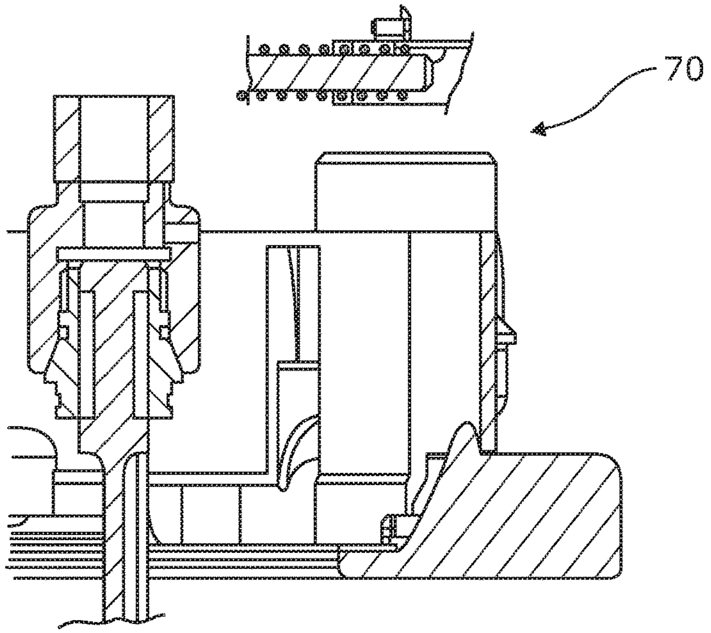
Figure 6:
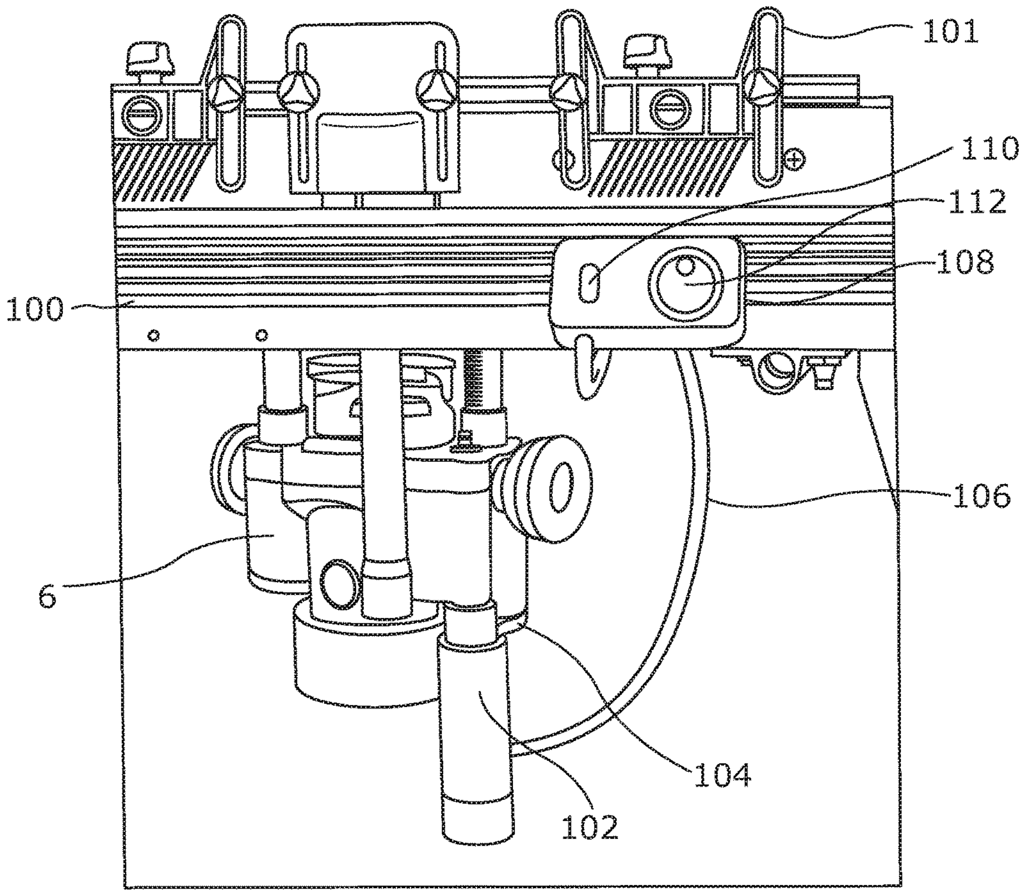

Specific embodiments of the invention are now described with reference to the accompanying drawings; wherein FIGS. 1*a-c* illustrate a perspective, elevation and plan views of first and second embodiments of a router tool in accordance with one embodiment of the invention;

FIGS. 2*a* and *b* illustrate the router of FIGS. 1*a-c* with a spring release mechanism;

FIGS. 3*a-b* illustrate the router of FIGS. 1*a-c* with dual springs;

FIGS. 4*a-b* illustrate a switch safety interlock cover in accordance with one embodiment of the invention;

FIGS. 5*a-e* illustrate views of a height adjustment mechanism for the housing with respect to the base; and FIG. 6 illustrates the selective attachment of a powered height adjustment means to the mechanism of FIGS. 5*a-e*.

Referring firstly to FIGS. 1*a-b* there is illustrated a router power tool 2 in accordance with the invention in one configuration of use and, in FIG. 1*c*, the router power tool is shown in a second configuration of use. The router can be used in two main positions. The first position is that shown in the FIGS. 1*a-c* in which the same is located on and above a work surface on which a workpiece for which the tool is to be used is located. In an alternative position shown in FIG. 6 the router can be turned through 180 degrees so that the base 8 is attached to the underside of the work surface so that effectively the router is used upside down and is located below the work surface.

In one configuration the base 8 may be attached to a guide plate 4 as shown in FIG. 1*c*, or may be attached directly to the work surface such as that provided as part of a workcentre of the type disclosed in the applicant's patent application GB2517640 and the contents of which are incorporated herein, or may be used in a freestanding mode as illustrated in FIGS. 1*a-b*.

The router includes a housing 6 which is connected to the base 8 by first and second extendable members 10,12 so as to be movable in relation thereto as indicated by arrows 14,16. From the underside 18 of the housing extends a shaft 20, which at its free end includes a tool holder 22. The tool holder receives a tool 24 and the shaft, tool holder and tool are rotated about axis 26 by connection of the shaft with a motor (not shown) located within the housing 6.

The tool passes through an aperture 28 in the base in order to engage and perform the work on the workpiece. The tool also includes first and second handles 30,32 which are located on the housing 6 on opposing sides of the same and typically at or adjacent to the first and second extendable assemblies 10,12 respectively. The handles are provided so as to allow the housing to be moved downwardly towards the base and generally to allow control of the tool in use.

In accordance with one aspect of the invention, the handles are asymmetrical with one handle 28 elongate in form along axis 32 and the other handle 30, being substantially circular in shape with its centre positioned about axis 34. The provision of the different shaped handles allows the gripping and control of the tool to be at least maintained as much as with respect to conventional routers whilst, at the same time, allowing access to be more easily obtained to other features of the router located at or around the housing, such as the power on and off switch 36 and/or for access to be obtained in a more convenient and comfortable manner. By adopting this approach so the shape of each particular handle can be selected to suit its specific use.

Referring now also to FIGS. 5*a-e* the position of the base 8 relative to the housing 6 is defined by the extendable assemblies 10, 12, with, in FIGS. 5*a-e* part of the extendable assembly 12 being shown. The extendable assembly includes a guide arm or post 66 which is fixed to the base 8 at it's lower end and is received within a fixture 68 on the housing 6. The adjustment of the housing 6 relative to the base plate 8 is performed in a plunge manner when the lever 99 is disengaged and the housing 6 can be forced towards the base against biasing means springs by the user exerting a force on the housing in the direction 16. When released the biasing means springs cause the housing to move in the direction 14 away from the base.

When the lever 99 is engaged as shown then a height adjustment mechanism 70 is engaged to provide a more controlled relative movement of the housing 6 and base 8 and which, preferably allows user selection of either coarse and fine adjustment of movement.

The height adjustment mechanism includes a sprocket 72 which engages teeth 74 on the guide arm 66. The sprocket 72 rotates on an axle 76 which is engagable with a coarse adjustment means which in this case is incorporated in the handle 30. The coarse adjustment means 30 is provided with a clutch mechanism which facilitates engagement between the sprocket 72 and the coarse adjustment knob 30 and the clutch mechanism includes a slidable sleeve 78 fitting over and rotationally fixed relative to a mounting shaft 80 and is engagable with the coarse adjustment means by axial movement along the mounting shaft 80. When the sleeve 78 engages with the coarse adjustment means of the handle 30, the relative position of the mounting shaft 80 and the coarse adjustment means is fixed until the sleeve is released, whereupon the sleeve returns to its original position under the action of a spring bias. As the mounting shaft 80 is directly connected to the sprocket 72, rotation of the handle 30 when the sleeve 78 is engaged, rotates the sprocket 72 causing the housing 6 to progress up or down the guide arm 66 teeth.

A fine adjustment means 82 is also provided which engages with teeth formed on the surface of mounting shaft 80. The fine adjustment knob is mounted on a substantially vertical shaft 84 having a screw thread 86 which engages with the teeth 88 on the mounting shaft 80. Rotation of the fine adjustment knob 82 and hence vertical shaft 84 causes small rotational movements of the mounting shaft and hence the sprocket 72. These movements are smaller than those caused by rotation of the coarse adjustment means in the handle 30.

FIG. 6 illustrates the tool 2 which is provided in a configuration in which the same is mounted on the underside of a work surface 100 as shown with the base 8 attached to the same. This illustrates how it can, especially in this mode, be difficult to access the coarse and fine adjustment means on the housing and extendable members from the top side 101 of the worksurface 100 which is where the user of the tool will be located. This problem is overcome in this aspect of the invention by attachment of a powered drive 102 to the adjustment knob 82 (not shown) so as to provide a drive connection which will achieve the rotation of the adjustment knob 82 when the drive means is powered. The powered drive is mechanically located via a clip portion 104 which locates on the housing 6 and is electrically connected via cable 106 to user controls 108 which include a selector 110 to allow fine or coarse adjustment to be achieved and a rotator 112 to allow the user to select the amount of adjustment to be achieved and therefore allows this to be done by the user remotely from the adjustment knob 82.

The adjustment mechanism allows the housing 6 to be progressed towards the base 8. The working depth of the cutting tool in the tool holder 22 is defined by the extension of the cutting tool beyond the base 8 and the tool holder 22 can extend through the base 8 aperture 28 to maximise the cutting depth that can be achieved and this also allows greater access to the tool holder 22 for changing the cutting tool.

Turning now to FIGS. 2*a* and *b* and 3*a* and *b* there is illustrated further detail relating to the extendable members 10, 12. The extendable members are typically telescopic in form, with an elongate member or guide arm 66 attached to the base and an elongate member fixture 68 attached or provided as part of the housing which overlap at their free ends and are slidingly located so as to allow adjustment of the distance between the housing and the base. The housing is biased towards the raised position by a biasing means spring 40 (shown in broken lines in FIG. 1*a*) which is a coil spring which extends along at least part of the length of the extendable assembly 12.

As shown in FIGS. 2*a* and *b*, the extendable assembly 12 includes a control portion 42 which is movable between a first position shown in FIG. 2*b* and FIGS. 1*a-c*, and a second position shown in FIG. 2*a*. The control portion can be retained in the first position by the provision of securing means 44, shown in FIG. 1*a* which engage with a collar 46 on the control portion.

When the control portion is in the first position, the spring end 48 is engaged and forced downwardly by a spring location portion 52 formed as part of the control portion 42 such that the spring biases the housing away from the base. This arrangement is as required when the router is used in the orientation shown in which the same is mounted on the top of a work surface and the tool is to be moved down or plunged towards the workpiece on the work surface. However, in another configuration of use, when the router is attached to the underside of the work surface as shown in FIG. 6, the housing is required to be moved upwardly and towards the underside of the work surface. This movement is typically caused by the user indirectly via a manual or powered winding mechanism which is attached to the router. In this configuration, and in order to allow the movement mechanism to be effective, it is desired to reduce the resistance to the movement of the housing towards the base and so in accordance with the invention the control portion 42 is moved to the second position by releasing the securing means 44, 46 and then rotating the control portion 42 knob 43 so as to cause a screw or bayonet style movement of the control portion 42 with respect to the housing 6 and in turn the the spring locating portion 52 moves linearly out of the extendable assembly 12 as indicated by arrow 54 in FIG. 2*a*. This, in turn, allows the spring 40 to extend and lengthen and so the biasing force of the same on the housing is reduced or removed when the control portion 42 is in the second position.

FIGS. 3*a* and *b* illustrate a further embodiment of the extendable members which can be used in conjunction with, or separately from, the embodiment illustrated in FIGS. 2*a* and *b*.

In this embodiment each of the extendable members 10, 12 are provided with a spring 56, 58 respectively. The provision of the spring in each of the extendable assemblies allows the downward force which is exerted by the user when gripping both handles to be substantially more uniformly spaced across the housing than is the case in the conventional apparatus with a spring in only one of the extendable assemblies. Also, the provision of the two springs means that the force required to be exerted by the springs can be split between the two springs meaning that each can be provided to have a reduced biasing force compared to the spring used when only one spring is provided. Furthermore, control portion 42 need only be provided for one of the said extendable assemblies, assembly 12, to allow the adjustment of the biasing force exerted by the biasing means spring 58 located therewith. Typically the biasing force which is exerted by that biasing means spring 58 is greater than the biasing force of the biasing means spring 60 located with the other extendable assembly 10 and therefore that spring condition need not be altered.

Turning now to FIGS. 1*a*, 3*a-b* and 4*a-b* there is illustrated switch interlock cover 60 which is located in the housing to act with the motor switch 36 which is biased to an off position.

The cover 60 is provided with a portion 62 which engages with the switch such that that the motor cannot be accidentally activated once switched off and typically the cover is spring loaded to engage with the switch to retain the switch in the off position. When a positive decision is made to move the switch to the on position the cover is moved by the switch, against the spring so as to move a safety stop portion 64 to partially overlie the extendable assembly 10 to limit the movement of the extendable assembly when the cover is held back in its retracted position by the switch in the on position.

As the housing 6 moves closer to the base plate 8, the guide arm 66 moves within and will eventually extend above the sleeve 68 top face 94. Fixtures can be provided on the housing 6 to define the limit of travel of the guide arm 6 along the side of housing 6 and are positioned to correspond to the position of the guide arms when the housing 6 is at its lowest position relative to the base plate 8.

The switch 36 receives the cover portion 62 in sliding engagement. The cover portion 62 covers and prevents access to switch 36 when the switch is in the off position and moves between that position and a position which allows access to the switch 36. The stop portion 64 of the cover extends between the cover portion 62 and housing 6. When the cover portion is not covering switch 36, stop portion 64 extends partially across the path of guide arm 66 as the housing is moved towards the base plate. When the stop portion 64 is in the position shown in FIG. 4*b* it is not possible for the guide arm 66 to travel to the full extent of travel and hence housing 6 is restricted from descending to its lowermost position relative to base 8 and so the tool holder 22 can be prevented from extending through the base 8 without the switch being moved to the off position. Once the switch 36 is switched off, cover 60 is spring loaded to return to the position to cover the switch 36 which removes the stop portion 64 from the path of the guide arm 66 allowing housing 6 to be moved closer to the base 8 and the power to the motor to rotate the tool holder is prevented from being activated.

Importantly, the safety stop portion 64 is formed such that the same contacts with only a part of the extendable assembly 10 to a sufficient extent to prevent movement whilst, at the same time, allowing access to the interior of the extendable assembly 10. This therefore makes it possible to allow a biasing means to be included in the extendable assembly whereas, previously, the safety stop portion extend across the extendable assembly and thereby prevented the use of a biasing means in that assembly 10 which, in turn, meant that only one biasing means could be provided and that had to be provided in the other of the extendable assemblies 12 which led to the router tool potentially being unbalanced in use.

There is therefore provided a router power tool with improved balance and ease of use with respect to the forces applied thereto by manual movement and also the force applied thereto by the biasing means located therewith.

During the tool changing operation, the tool holder 22, while it extends through the aperture 28 in the base 8 can be immobilised by engagement of a releasable latch which includes an external plunger and a pin for engagement with a recess in the tool holder, all contained within the lower part of the housing 6. When the housing is at its lowest position it contacts with an inclined face inside the base 8 which pushes the pin to contact with the recess in the tool holder which extends beyond the base so that the tool holder is immobilised and in which position the tool held therein can be removed and replaced. To disengage the latching mechanism, the router is raised, removing the inclined face on the base from contact with the inclined face inside the base and the pin can then be retracted.

The invention claimed is:

1. A power tool which comprises:

a housing and a base, said housing mounted to be moveable with respect to, and spaced from, the base, said housing including a motor to rotate a shaft, said shaft having a free end at which is located a tool holder for a cutting tool, said shaft extending from the housing such that the tool holder is located at or adjacent to the base and said housing is connected to the base by at least first and second extendable assemblies, at least one of the assemblies including biasing means located so as to provide a biasing force so as to bias the housing away from the base and the said at least one extendable assembly is provided with a control portion which is movable from a first position in which the biasing means is engaged to provide the biasing force and a second position in which the biasing means is released from providing the biasing force wherein said control portion includes a spring location portion which moves linearly out of the extendable assembly when the control portion is moved to the second position so that the control portion is retained with an elongate fixture member of the extendable assembly while in the second position.

2. A power tool according to claim 1 wherein said control portion is rotated between the said first and second positions and during which the control portion moves in a linear direction.

3. A power tool according to claim 1 wherein the control portion is locked in said first position by securing means.

4. A power tool according to claim 3 wherein the control portion movement is guided by a screw or a bayonet fitting between a male part formed in one of the control portion or an elongate member of the said assembly and a female part formed in the other of the said control portion or elongate member.

5. A power tool according to claim 1 wherein the biasing means is a coil spring and when the control portion is in the second position the spring extends along the extendable assembly to a substantially relaxed condition so as to remove or reduce the biasing force exerted.

6. A power tool according to claim 1 wherein the control portion is moved to a third position to allow removal of the biasing means.

7. A power tool according to claim 1 wherein the control portion is provided in the first position when the tool is to be located for use on a top side of a work surface and is moved to the second position when the tool is to be located for use on an underside of the work surface.

8. A power tool according to claim 1 wherein a biasing means is provided in both of the said extendable assemblies.

9. A power tool according to claim 8 wherein the control portion is provided for one of the said extendable assemblies to allow the adjustment of the baising force exerted by the biasing means located therewith and the said biasing force exerted thereby is greater than the biasing force of the biasing means located with the other said extendable assembly.

10. A power tool according to claim 1 wherein the tool includes a switch which allows the switching on and off of the motor and a cover is provided for the switch which is spring loaded to engage with the switch to retain the switch in the off position and the cover is held back by the switch, against the spring loading, when the switch is in the on position.

11. A power tool according to claim 10 wherein the cover further includes a safety stop portion which limits the movement of at least one of the extendable assemblies when the cover is held back by the switch in the on position.

12. A power tool according to claim 11 wherein the safety stop portion contacts with part of the top face of a guide arm of the extendable assembly to prevent further movement of the extendable assembly when the switch is in the on position whilst allowing access to the interior of the extendable assembly to allow a biasing means to be included in that extendable assembly.

13. A power tool according to claim 1 wherein a height adjustment mechanism is provided to allow adjustment of the position of the housing with respect to the base, said mechanism including a sprocket which engages teeth formed as a rack along a guide arm of an extendable assembly and the sprocket is selectively engaged by a coarse adjustment means or a fine adjustment means which are operated manually or by powered means.

14. A power tool according to claim 13 wherein the movement of the housing with respect to the base is a plunge movement in which a user exerts a movement force to move the housing towards the base with the adjustment mechanism disengaged.

15. A power tool according to claim 1 wherein the tool includes first and second handles, said handles located at, or adjacent to, the extendable members on opposing sides of the said shaft and wherein the handles are provided of different shapes.

16. A power tool according to claim 1 wherein the tool holder is moved through an opening in the base so that at least a portion of the tool holder lies to the side of the base plate opposing that at which the housing is provided so as to be accessible for the cutting tool to be located with and removed from the tool holder and the base includes engagement means for engagement with the tool holder when the power tool is switched off.

17. A power tool according to claim 1 wherein first and second handles are attached to the housing to allow a movement force to be exerted to move the housing towards the base and to grip the tool in use and wherein the first and second handles are asymmetrical.

18. A power tool according to claim 1 wherein the power tool includes a switch which allows the switching on and off of the motor and control of whether the cutting tool is capable of being rotated or not, a cover is provided for the switch such that that the motor cannot be accidentally activated once switched off and when the switch is moved to the on position the cover is held back by the switch, against a biasing force, said cover further includes a safety stop portion which limits the progress of at least one of the extendable assemblies when the cover is held by the switch in the on position and wherein the safety stop portion is formed to contact with the said guide arm of the said at least one extendable assembly to a sufficient extent to prevent further movement of the extendable assembly when the switch is in the on position and to allow a biasing means to be included in the said extendable assembly.

19. A power tool which comprises:

a housing and a base, said housing mounted to be moveable with respect to and spaced from the base, said housing including a motor to rotate a shaft which includes a free end, a tool holder for a cutting tool located at said free end, said shaft extending from the housing such that the tool holder is located at or adjacent to the base and said housing is connected to the base by at least first and second extendable assemblies and a height adjustment mechanism is provided which includes a sprocket which engages teeth formed as a rack along a guide arm of at least one of the extendable assemblies and the movement of the housing with respect to the base is by a plunge movement in which the user exerts a movement force to move the housing towards the base, or is made via the height adjustment mechanism operated by hand or via powered drive connected thereto and wherein at least one extendable assembly is provided with a control portion which is movable from a first position in which the biasing means is engaged to provide the biasing force and a second position in which the biasing means is released from providing the biasing force and said control portion includes a spring location portion which moves linearly out of the extendable assembly when the control portion is moved to the second position so that the control portion is retained with an elongate fixture member of the extendable assembly while in the second position.

* * * * *